United States Patent [19]
Jordan, III

[11] Patent Number: 6,053,122
[45] Date of Patent: Apr. 25, 2000

[54] SPORT FISHING OUTRIGGER

[75] Inventor: Robert T. Jordan, III, Jupiter, Fla.

[73] Assignee: E-Tec Marine Products, Inc., Riviera Beach, Fla.

[21] Appl. No.: 09/022,111

[22] Filed: Feb. 11, 1998

[51] Int. Cl.$^7$ .................................................. B63B 35/14
[52] U.S. Cl. ........................................... 114/255; 43/21.2
[58] Field of Search ........................... 114/255; 212/292; 43/21.2; 248/514, 515, 535, 538

[56] References Cited

U.S. PATENT DOCUMENTS

| | | |
|---|---|---|
| 3,724,791 | 4/1973 | Mason . |
| 4,384,542 | 5/1983 | Wilson . |
| 4,993,346 | 2/1991 | Rupp . |
| 5,140,928 | 8/1992 | Frick . |
| 5,191,852 | 3/1993 | Rupp ...................................... 114/255 |
| 5,243,927 | 9/1993 | Messik . |
| 5,245,780 | 9/1993 | Hansen . |
| 5,592,893 | 1/1997 | Jordan . |

*Primary Examiner*—Sherman Basinger
*Attorney, Agent, or Firm*—McHale & Slavin PA

[57] ABSTRACT

A sport fishing outrigger assembly with a position adjustment positive locking mechanism and guide sleeve capable of indexable adjustment and non-slip positive locking of a rotatably deployable outrigger boom assembly. The guide sleeve allows the outrigger to be lowered in a vertical direction for deployment in an outboard position for passage beneath low bridges in a transom position and does not inhibit rotational movement of the outrigger boom.

23 Claims, 7 Drawing Sheets

SPORT FISHING OUTRIGGER

FIELD OF THE INVENTION

This invention relates to the field of sport fishing and in particular to an outrigger system having a vertically displacement outrigger boom capable of rotational movement.

BACKGROUND OF THE INVENTION

Saltwater sport fishing typically consists of placing anglers on boats to reach productive offshore fishing grounds. A productive method of catching fish involves a technique known as trolling wherein the angler drags baited hooks behind the stern of a slow moving boat. To increase the chance of hooking a fish, it is an important consideration to have as many lines in the water as possible. In general, the wake of the boat appears, to a gamefish, as a large school of smaller fish. With a multitude of baited lines, the fisherman can strategically simulate bands of straggling or displaced fish from the school. These stragglers are the weaker fish that gamefish typically prey upon.

Ideally a fisherman will drag as many lines as possible behind the boat to increase the chances of a strike. However, the more lines that are used, the higher the chance of the lines becoming tangled with each other. This is particularly true of a narrow beam boat or any boat that is in the process of being turned. As a result, sport fishing outriggers have been developed to assist in keeping the various lines separated.

Outriggers consist of a long pole, or boom, having one end secured to the boat with deployment caused by the outward lateral extension of the boom from a side of the boat. Baited fishing lines, with release clips, are attached to the outriggers and thereby provide enough separation between the lines to prevent tangling. When a fish strikes the bait, the line clip releases from the outrigger and the fisherman reels in the fish.

By law (and practicality), outriggers must be freely stowable to a position along-side the boat for close quarter operation and docking. For practical operation, the outrigger must necessarily be swung laterally outward to its deployed position. The prior art, not necessarily patented, but used for many years in the field, includes all types of mounting schemes including outrigger units for horizontal and vertical mounting, on center consoles, flybridges, half towers, tuna towers, radar arches, and/or T-tops. Prior patents disclose a variety of methods for mounting, deploying, and locking into place such outriggers (see e.g. U.S. Pat. Nos. 3,724,791; 4,384,542; 4,993,346; 5,140,928; 5,191,852; 5,243,927; and 5,245,780), with each having distinct drawbacks. Such drawbacks include overall mechanical complexity; powered operation; non-durable metal-on-metal construction; and/or ineffective position adjustment and locking mechanisms which slip and/or wear out, especially due to metal-on-metal construction.

U.S. Pat. No. 4,384,542 discloses collapsible support members and a slidable connection for achieving pivotal movement of the tubular member about multiple axes.

U.S. Pat. No. 5,140,928 discloses a complex electro-hydraulic mechanism with a helm-mounted joystick control system for independent movement of each outrigger boom.

U.S. Pat. No. 5,243,927 discloses a tubular housing with a hydraulically driven piston for positioning the attached outrigger.

U.S. Pat. No. 5,245,780 discloses an outrigger with variable length strut members to change the position of the outrigger device.

While the prior art discloses a wide variety of mechanisms and mounting locations, the prior art fails to disclose or otherwise teach a simple, yet durable, outrigger system having an effective locking mechanism and a means for vertical displacement of the boom. This is particularly necessary in light of the excessive movement experienced by a long outrigger in operation. A 20–30 foot boom will be affected by both wind and movement of the boat which causes incessant back-and-forth stresses at the outrigger's mount. In general, the longer the boom, the higher the stresses at the mounting bracket. If the position adjustment and/or locking mechanism were to fail, the outrigger might freely swing out during a critical maneuver or operation, with possibly disastrous or life-threatening effects to passengers on board the outrigger equipped boat or surrounding vessels. For this reason, the inventor developed an outrigger assembly with a position adjustment and locking mechanism as set forth in U.S. Pat. No. 5,592,893, the disclosure of which is incorporated herein by reference. The invention also eliminated the metal-on-metal devices which produced excessive wear and galling of the aluminum parts.

As described in various prior art patents previously mentioned, the mounting and operation of a conventional outrigger system on a medium or large size boat can be quite complicated. Booms of considerable length must be stored in an upright position to allow the vessel to pass beneath low bridges and for close quarter maneuvering. Preferably the boom and outrigger not only rotates outward from the side of the vessel but can also be easily lowered from the raised storage position for deployment. Thus, in operation of a conventional boom, the boom is moved into position by first unclamping a securement bracket which allows the outrigger to be rotated outward wherein the individual holds onto the boom by a flexible line until full deployment. An individual must then stand beneath the outrigger wherein the vertical adjustment post, now extending over the water, is disabled so as to lower the boom to the appropriate trolling angle. The aspect of moving the boom in an outward position is quite dangerous in any type of ocean action. In many instances the vertical position of the boom is first lowered wherein a wave action may cause the boom to swing out while unsecured placing the individual in peril of falling overboard.

Similarly, should the boat pass under a low bridge, the boom must be lowered. In this instance, the boom is detached from the securement clamp and the vertical adjustment disengaged allowing the individual to lower the boom. Again, it is noted that when the boom is detached from the securement clamp it may also pivot outward. Only the individual handling the boom can prevent the outward movement of the boom while in an unsecured position.

Accordingly, what is lacking is an outrigger assembly having both a simplified boom position adjustment and locking mechanism to eliminate the complicated struts commonly used to support outrigger booms.

SUMMARY OF THE INVENTION

The present invention is a sport fishing outrigger assembly having both a vertical and rotational boom adjustment and locking mechanism. The assembly is intended for mounting on the side surface of a boat or related boat support structure. It should be noted that side surface of a boat as used herein can be any surface along the side of a boat including, but not limited to, the use of a T-top as a base structure and a tuna tower for guide assembly support. The outrigger assembly has a boom coupled to a position adjustment locking mechanism. The locking mechanism includes an indexing collar with at least two vertically oriented castellated aperture slots. The collar is attached to an indexing pipe having a first end angularly secured to the boom and a second end pivotedly coupled to the side surface of the boat. A handle on the locking mechanism provides engagement with the aperture slots. An adjustable base member or the like structure allows a mounting mechanism to be universally adapted despite the planar orientation of the mounting service.

A guide assembly is secured above the position adjustment locking mechanism and indexing pipe for use in maintaining the mechanism in a position parallel to the side surface of the boat. The indexing pipe allowing the distal end of the boom to be rotated from a storage position parallel to the side surface of the boat to a deployment position, a predefined position outboard from the side surface of the boat. The guide assembly includes a spring biased locking clamp which is operatively associated with a clasp mounted to the position adjustment locking mechanism for maintaining the boom in a raised position. A primary locking pin may be used to provide lock the clasp directly to the guide assembly. Optionally, the locking clamp can be disabled by use of a locking pin which prevents disengagement of the clasp from the locking clamp.

Accordingly, it is an objective of the present invention to disclose a sport fishing outrigger assembly that is both rotatable and vertically movable.

A related objective of this invention is to provide an outrigger employing a rotational locking means with positive, non-slip indexing and locking.

Still another objective of this invention is to provide vertical position adjustment and locking mechanism wherein deployment positions can be easily located, positive locked, and repeated.

A further objective of this invention is to provide a corrosion resistant, and similar or dissimilar metal corrosion resistant, outrigger assembly.

Yet another objective of this invention is to provide a guide assembly that has both primary and optional secondary pin locks to prevent movement of the boom while in a storage position.

Other objectives and advantages of this invention will become apparent from the following description taken in conjunction with the accompanying drawings wherein set forth, by way of illustration and example, certain embodiments of this invention. The drawings constitute a part of this specification and include exemplary embodiments of the present invention and illustrate various objects and features thereof.

DETAILED DESCRIPTION OF THE PREFERRED EMBODIMENT

Although the invention has been described in terms of a specific embodiment, it will be readily apparent to those skilled in this art that various modifications, rearrangements and substitutions can be made without departing from the spirit of the invention. The scope of the invention is defined by the claims appended hereto.

Figure 1:
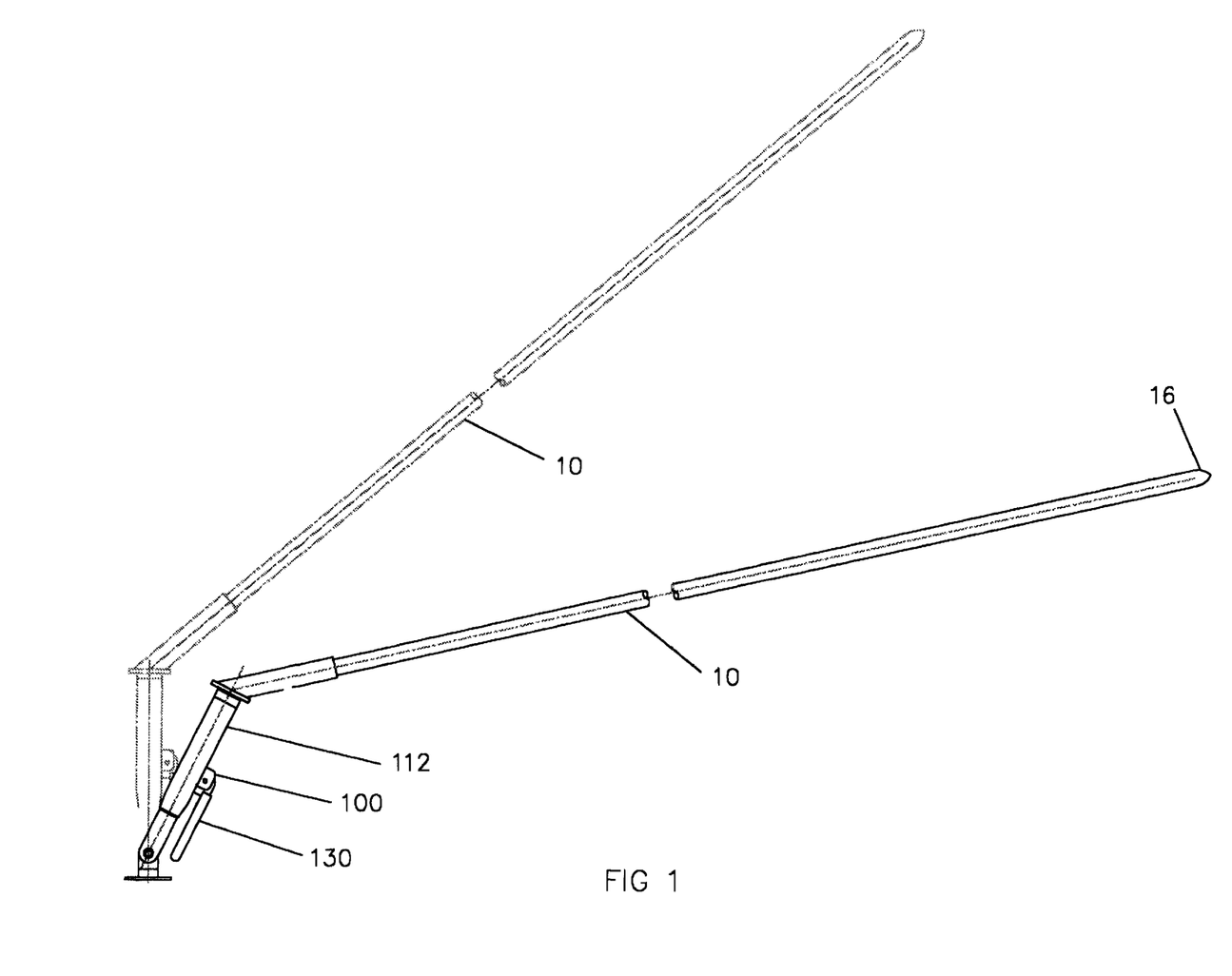
FIG. 1 is a side view of the outrigger boom illustrated in a raised and lowered position.
Figure 2:
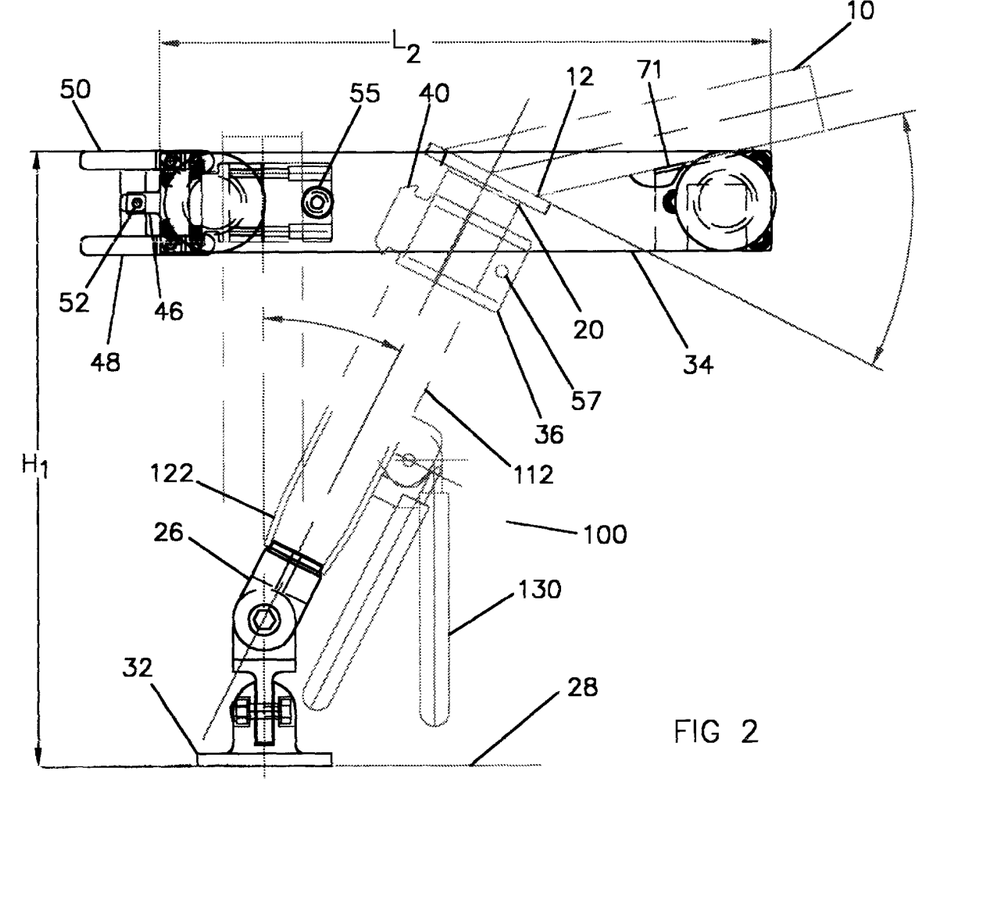
FIG. 2 is a side view of the position adjustment locking mechanism in conjunction with the guide assembly.

Now referring to FIGS. 1 and 2, set forth is an illustration of the sport of fishing outrigger boom 10 and position adjustment locking mechanism 100 of the instant invention. The boom 10, has a length defined by a proximal end 12 and a distal end 16. The length is dependant upon the size of a boat and may 30 feet or longer. Along the length of the boom is outrigger lines, not shown, which are used in conjunction with pulleys positioning of fishing lines and the associated bait along the length. The proximal end 12 is permanently secured to the position adjustment locking mechanism 100 which consists of an indexing collar described later in this description. Handle 130 is used for engagement of the indexing collar. As shown in FIG. 1, the angle between the stored position of the boom 10 and the deployment or lowered position as depicted by numeral 10' is approximately 40 degrees. Thus, placement of the position adjustment locking mechanism 100 in an upright position maintains the boom 10 at approximately 40 degrees off the horizon. In this manner the distal end 16 can be lowered for passage under a bridge as well as providing extended outboard coverage in a plane close to a horizontal surface of the water.

Figures 2A, 2B:
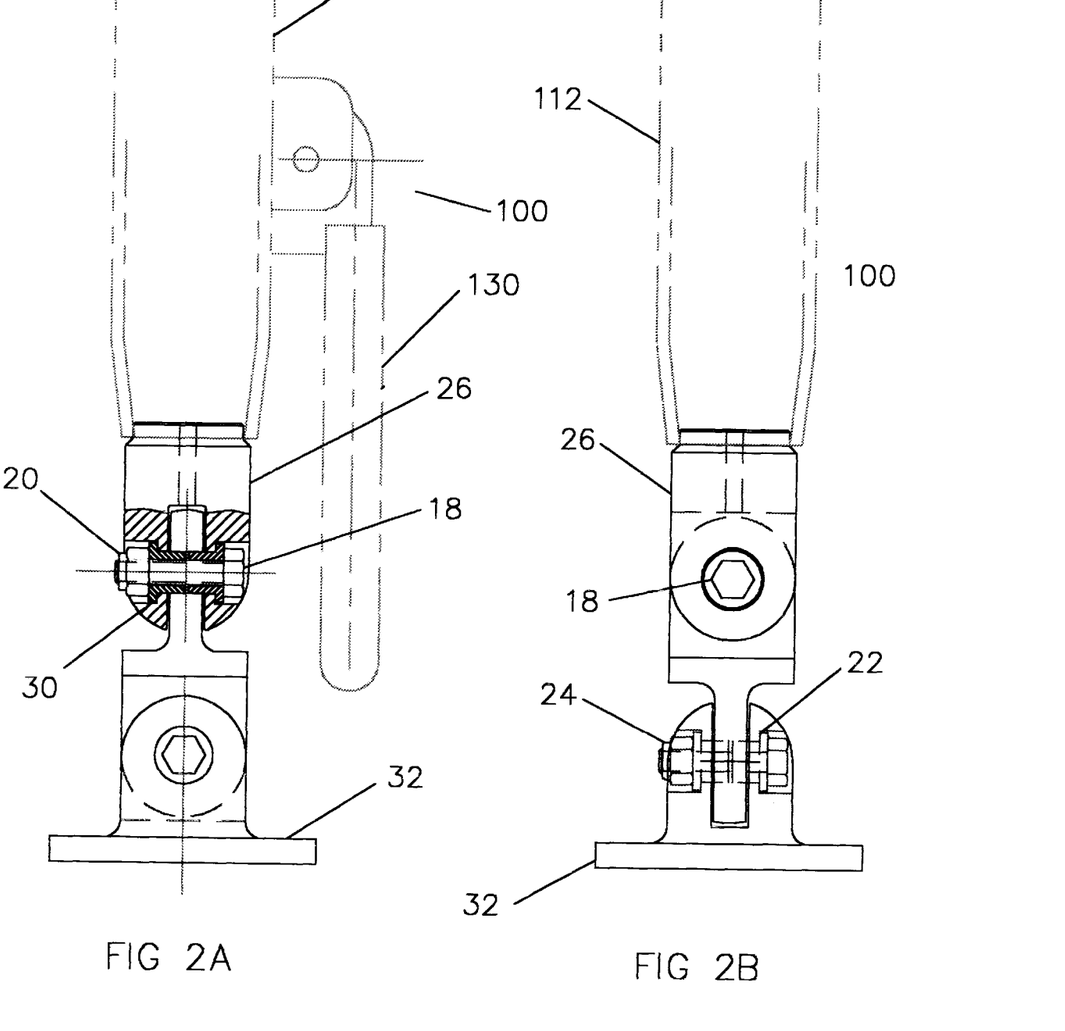
FIG. 2A is an enlarged end view of the mounting bracket for the position adjustment locking mechanism.
FIG. 2B is an enlarged side view of the mounting bracket for the position adjustment locking mechanism.

The boom adjustment locking mechanism 100 has a first end 20 which is secured to the proximal end 12 of the boom 10 at the predefined angular displacement. The position adjustment locking mechanism further consists of an indexing pipe 112 and a second end 120 having a clevis pivotedly coupled to a side surface 28 of a boat. The clevis 26 includes a centrally disposed bushing 30 which allows pivotal securement to an adjustable base 32 which is positioned perpendicular to the clevis bushing 30 making the adjustable base member 32 universally adaptable to any angular position along the side surface of a boat. The clevis 26 coupled to the adjustable base member 32 by use of a bolt 18 and nut 20 drawn through the bushing 30. It is noted that the base member 32 illustrated is but one embodiment of a mounting structure and the shape of which is not deemed limiting to this invention. The base member may be simplified by use of a single structure formed integral to the clevis, not shown. In this embodiment, the adjustable base member 32 includes a bolt 22 and nut 24 drawn through the clevis 26 providing pivotal placement. In should be noted that the adjustable base member 32 need not have a bushing and preferably has a ratchet or the like locking arrangement to prevent pivoting of the adapter 32 once secured to the side surface of a boat.

The position adjustment locking mechanism 100, is operatively associated with a guide assembly 34 which maintains the indexing pipe 112 parallel to the side surface of the boat. The guide assembly 34 is securely mounted to the side surface of the boat a predetermine distance above the position adjustment locking mechanism 100 as depicted. The guide assembly includes a locking clamp 38 for engagement of a clasp 36 formed either integral to the indexing pipe 112 or constructed from a bracket that encompasses the indexing pipe 112 wherein engagement tab 40 is used for engaging the lock clamp 38. The lock clamp 38 having finger brackets 48 and 50 which are biased in a closed position by springs 44 and 45. The locking clamp 38 having a pivot point 46 formed from a T-shaped bracket preferably constructed from neoprene, which maintains the finger brackets apart which must be depressed for purposes of releasing the clasp 40 once engaged.

A primary locking mechanism is provided by keyhole 55 placed through base plate 62 and cover 68 having an alignment to keyhole 57 of clasp 40. The keyholes 55 and 57 are aligned with the boom is placed in a raised and clamp lock position and allows for the engagement of key pin 56 to prevent movement of the boom while in the raised or stored position. In operation, pin 56 must be removed if the boom is to be lowered. Once pin 56 is removed an individual may depress finger brackets 48 and 50 of locking clamp 38 causing the clasp 40 to be released. Upon release of the clasp 40, rotation along clevis bushing 30 is permitted as well as the lowering of the boom 10 until it rests against guide support 58. Optionally a secondary locking pin hole 52 is receptive to a key pin 54 for maintaining the finger brackets 48 and 50 in a spaced apart position to prevent accidental release of the clasp 40.

Figure 3:
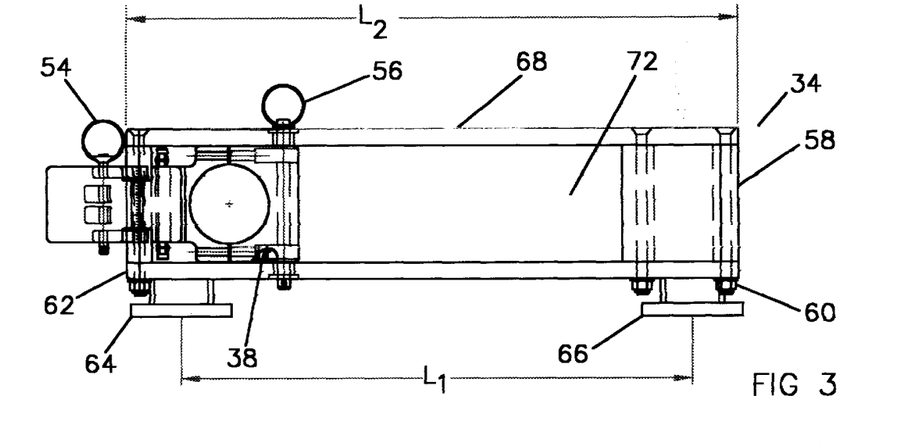
FIG. 3 is a top view of the guide assembly with the locking clamp and boom clasp engaged.

Referring now to FIG. 3, set forth is a top view of the guide assembly 34 having base-plate 62 with securement flanges 64 and 66 which maintain the base-plate apart from the side surface of the boat and allows the attachment of cover 68 by the use of conventional securement bolts 60. Spacing of the cover 68 is performed by the locking clamp 38 along one end and a guide support 58 along the opposite end. The guide assembly 34 forms a guide aperture 72 which prevents the indexing pipe 112 from moving out of a plane parallel to the side of the boat.

The guide assembly 100 provides storage securement of the boom in a raised position while the guide support 58 provides support of the boom while in a deployed position. A non-metal coating may be placed over the guide support 58 to prevent marring of the boom in rough seas. Alternatively the boom may have a coating or a raised boss 71. The raised boss 71 may be constructed of neoprene or the like material, the use of a raised boss further lessens the weldment between the indexing pipe 112 and the boom 10 by inhibiting the movement of the boom 10 across the spacer support 58.

The guide assembly 100 prevents the angular articulation of the indexing pipe 112 from the side surface of the boat and only allows for the vertical articulation. The approximate length $L_1$ between securement flanges 64 and 66 is approximately 15 inches and the guide assembly has an overall length $L_2$ of approximately 18 inches. The vertical range of the boom may be adjusted by either increasing the guide aperture 72 or by changing the mounting position of the clevis 26. The preferred distance when the base member 32 is extended and the top of the guide assembly 34 is $H_1$ of approximately 18½ inches. It is understood that the variances to the size of the aperture 72 and mounting height may also vary depending upon the angular coupling of the boom to the indexing pipe and is within the scope of this invention.

Figure 4:
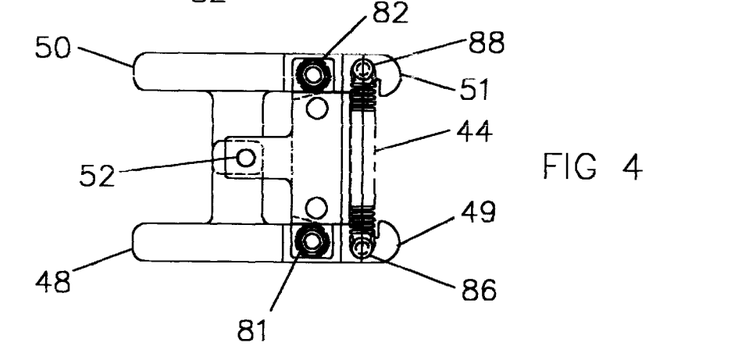
FIG. 4 is a side view of the locking clamp.
Figure 5:
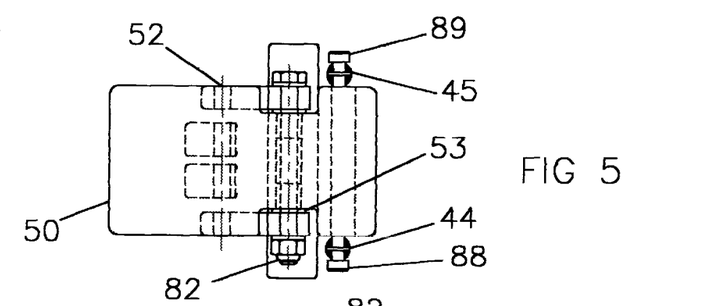
FIG. 5 is a bottom view of the locking clamp.

FIGS. 4 and 5 depict the locking clamp 38 and is illustrated with finger brackets 48 and 50 biased in a closed position by springs 44 and 45. The keyhole 52 depicts the relationship between the finger brackets and the T-bracket 46. The finger brackets are secured in position and pivot around securement bolts 81 and 82. Spring 44 is attached to shoulder 86 and 88 along one side with the opposite side spring 45 having similar shoulders such as that depicted by numeral 89. The end 49 of finger bracket 48 is hooked shaped for purposes of engaging the engagement section of the clasp 40. Similarly end 51 of finger bracket 50 forms a mirror image and is also hooked shaped for purposes of engaging the opposite end of the engagement section of the clasp 40. The finger brackets are isolated from the securement bolts 81 and 82 by use of a bushing, exemplified by numeral 53.

Figure 6:
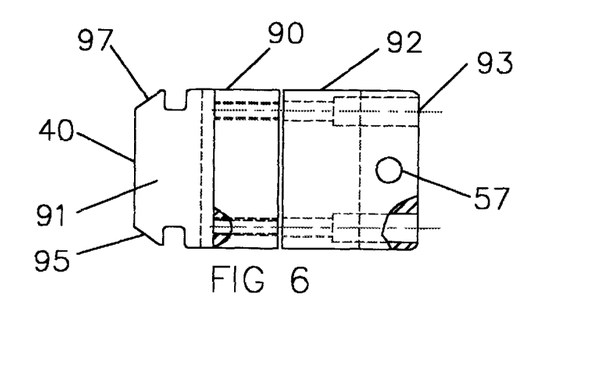
FIG. 6 is a side view of the boom clasp.
Figure 7:
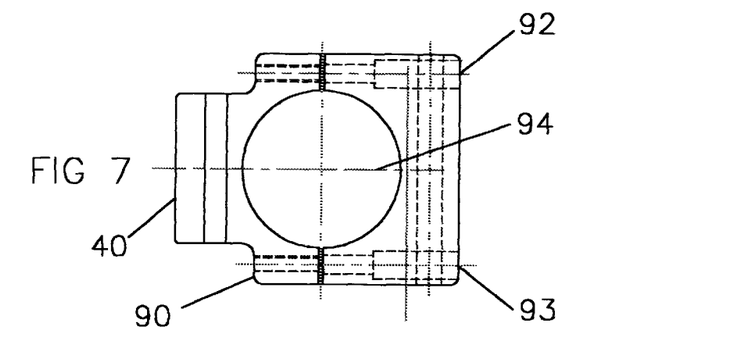
FIG. 7 is a top view of the clasp of FIG. 6.
Figure 8:
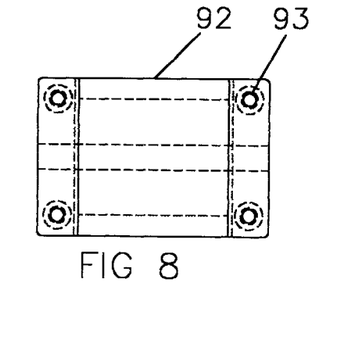
FIG. 8 is a rear view of the clasp of FIG. 6.

Now referring to FIGS. 6–8, the non-integrated embodiment of the clasp 40 characterized by the insertion end 90 and coupling end 92. The insertion end 90 and coupling end 92 frictionally engage the outer surface of the indexing pipe and form a centrally disposed aperture 94 sized to conform to the indexing pipe. The coupling end 92 employs mounting holes 93 spaced along each corner and countersunk so as to allow insertion of a threaded screw, not shown, for engagement of the insertion end 90. The insertion end 90 includes a tab 91 which is operatively associated with the locking clamp as detected in FIG. 4. The tab 91 having engagement ends 95 and 97 which engage hooked shaped ends 49 and 51 respectively.

Figure 9:
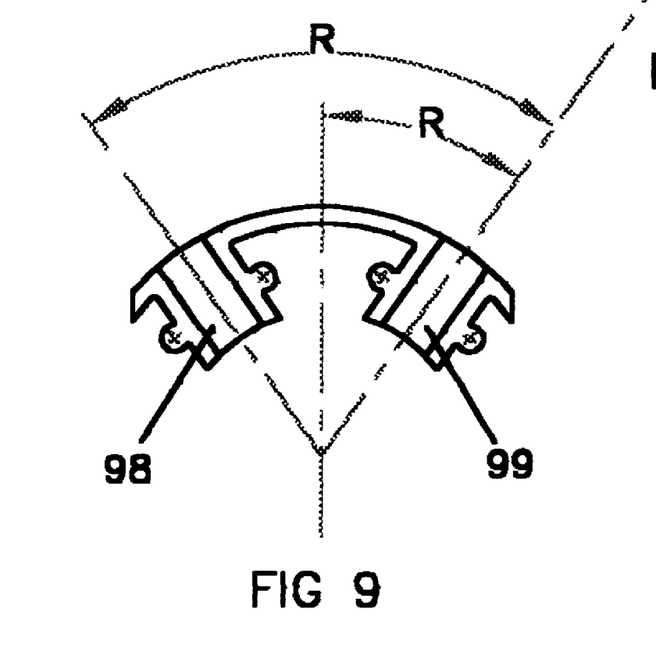
FIG. 9 is an angular layout of the indexing collar.
Figure 9A:
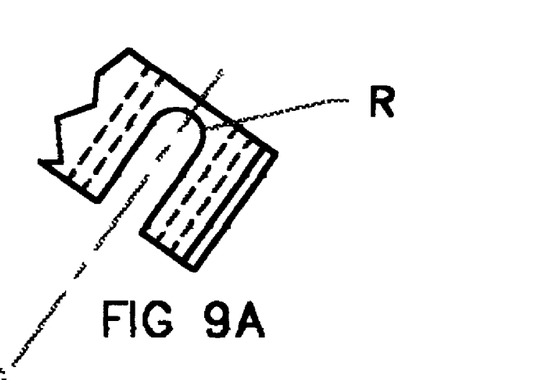
FIG. 9A is a partial view of the indexing collar slot.
Figure 10:
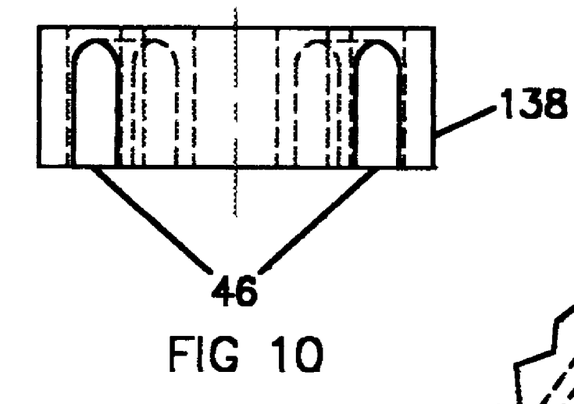
FIG. 10 is a cross sectional view of the indexing cap.

FIGS. 9–10 depict the use of the position adjustment locking mechanism having the indexing collar 138 having at least (2) vertically oriented castellated aperture slots 46. The indexing slot having a radii of about 70 degrees between placement of the boom in a storage position to the deployment position. It is noted that additional aperture slots may be incorporated into the indexing collar 138 for positioning or deployment of the boom at distinct angular positions. However, for simplicity purposes a storage and deployment position has been calculated and shown as the preferred embodiment. The inner radius of the preferred embodiment is approximately 1 inch and the outer radius is approximately 1.725 inches. The indexing collar 138 is constructed of aluminum and has delrin inserts to prevent metal on metal contact.

Figure 11:
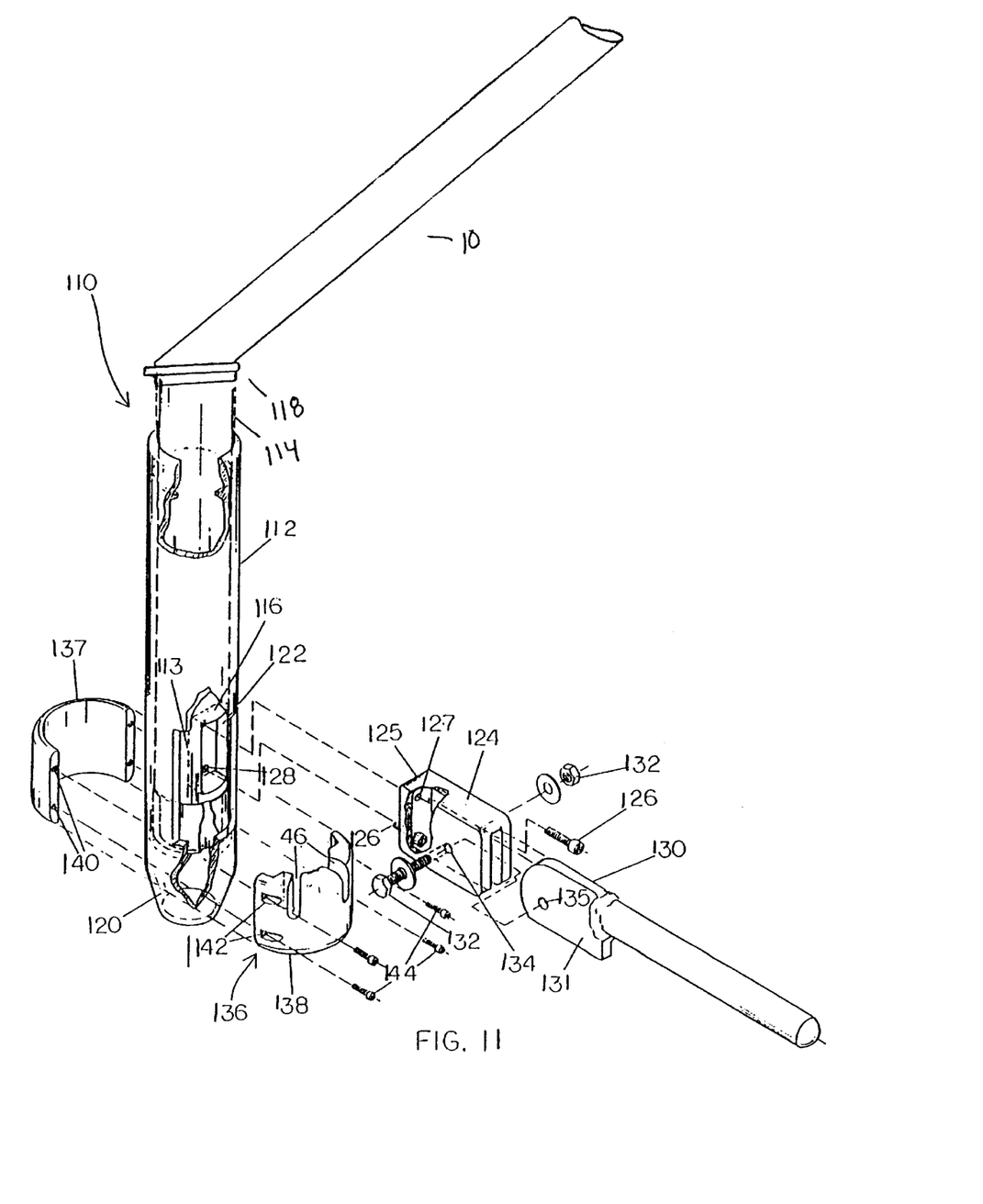
FIG. 11 is an exploded view of the position adjustment locking mechanism.

Referring now to FIG. 11, the position adjustment locking mechanism 100 is shown in an exploded view apart from the mounting brackets to show the interaction of the component parts. The assembly consists of an outrigger boom 10 is shown mounted to the top of the central pivot core 116. These metal parts are preferably welded together at aforementioned 40 degree angle. A plastic pivoting bushing 118 is inserted over pipe 114 and a bottom plastic pivot bearing is inserted on the bottom on the central pivot core 116. This inner assembly is then inserted into the indexing pipe 112, wherein a pipe adapter 120 is welded to the bottom of pipe 112. Pipe adapter 120 is used as a load bearing mounting fixture for receiving a supporting pipe.

A plastic (or non-metal composite) mounting bracket 124 is fixably mounted into central pivot core 116 via fitting its attachment end 125 into cavity 122 of pivot core 116. This is accomplished by aligning cavity 122 with the vertically elongated window aperture 113 near the bottom of indexing pipe 112. Cavity 122 is formed deep enough to assure secure attachment of the bracket 124. The bracket 124 is attached with machine screws 126 penetrate mounting holes 127, and which are received by threaded holes 128 in cavity 122. A handle locking engagement assembly is comprised of a handle 130 with an end distal and proximal to the user's hand, with a locking bar extension 131 weldably attached to a cavity in the distal end of the handle. The assembly is then mounted into bracket 124 by inserting a self-locking nut, bolt, and washers combination 132 through the hole 134 of the mounting bracket 124 as aligned with the hole 135 of the handle/locking bar 130, 131. Due to the relative flexibility of the bracket 124, the frictional tightness of the mounted handle 130 can be adjusted via the tightness of the self-locking nut and bolt combination 132.

The position adjustment positive locking mechanism includes a split aluminum indexing collar 136 consisting of semicircular halves 137 and 138. The rear half 137 includes four threaded screw holes 140 and the front half 138 includes corresponding screw holes 142, wherein screws 144 are used to fixedly attach the collar 136 around the lower portion of the indexing pipe 112. The front half 138 of the collar 136 contains two vertical slots 146, which together form a castellated surface on the upper part of collar half 138. The collar 136 is mounted so that span of vertical slots 146 is generally centered over the lower portion of the aperture 113. Collar 136 is also mounted so that the lowermost extension of the slots 146 generally aligns with the lower edge of aperture window 113. A locking bar 131 on handle 130 extends downwards a sufficient amount to penetrate the slots 146 to positive lock the outrigger in place. The slots having delrin or the like non-metal material to prevent metal-to-metal engagement.

Figure 12:
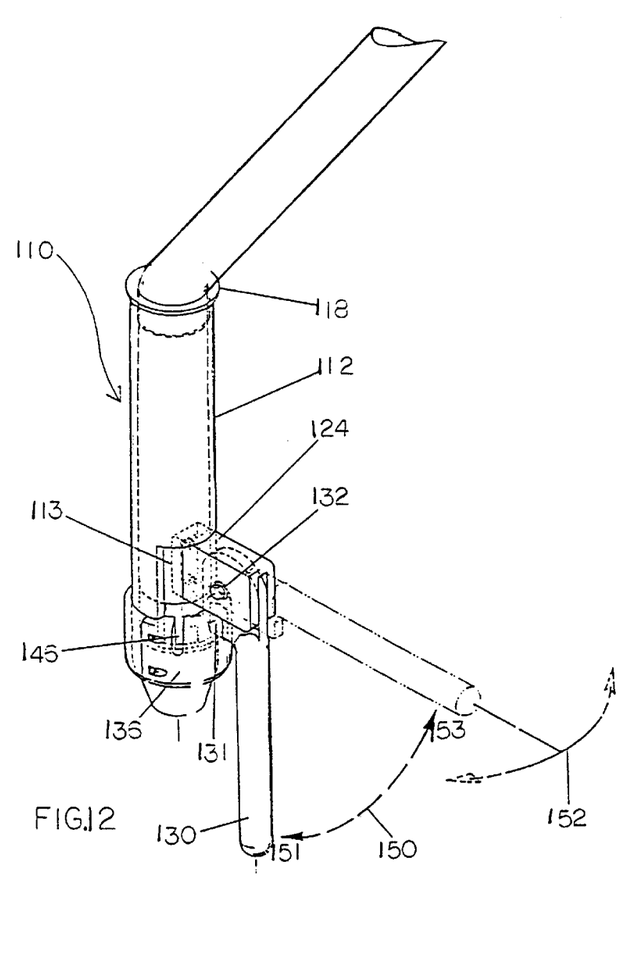
FIG. 12 is a side perspective view of the position adjustment locking mechanism.
Figure 12A:
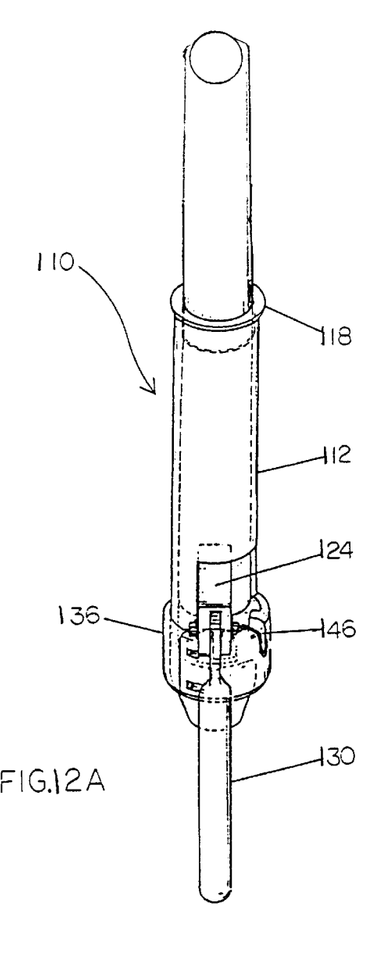
FIG. 12A is a front perspective view of the position adjustment locking mechanism.

Referring now to FIGS. 12 and 12A, the assembled outrigger is shown in operation. As shown by arrows 150, the mounted handle 130 pivots along the axis formed by the bolt, washers and self-locking nut 132 to a positive locked 151 and unlocked 153 position. When in the positive locked position 151, the locking bar 131 is aligned with and penetrates a slot 146. The locking bar 131 is generally the same width as the corresponding slots to provide a snug fit. When in the unlocked position 153, the mechanism is free to deploy the attached extension tube 114 along the arc of positions shown by arrows 152. The range of this arc is generally defined by the width of the elongated window aperture 113 in indexing pipe 112. Similarly, the number of castellated slots 146 as included on the collar 36 determines the range of possible indexed positions.

As assembled, these parts provide a unique outrigger assembly with distinct advantages over the outriggers of the prior art. It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown in the drawings and descriptions.

What is claimed is:

1. A sport fishing outrigger assembly comprising:
  a boom having a length defined by a proximal end and a distal end;
  a position adjustment locking mechanism having a first end angularly secured to said proximal end of said boom and a second end having a clevis pivotedly coupled to a side surface of a boat, said position adjustment locking mechanism including an indexing collar with at least two castellated aperture slots for receivable engaging a handle;
  a handle locking engagement assembly operatively associated with said position adjustment locking mechanism, said handle permitting manual rotation movement of said boom; and
  a guide means secured to said side surface of said boat above said second end of said position adjustment locking mechanism;
  whereby said guide means maintains said position adjustment locking mechanism in a parallel position to said side surface of said boat in a raised or lowered position and said position adjustment locking mechanism allowing said distal end of said boom to be rotated from a storage position parallel to said side surface of said boat to a position outboard of said boat.

2. The sport fishing outrigger assembly according to claim 1 wherein said clevis includes a centrally disposed bushing allowing pivotal securement to a base member means adaptable for securement to the boat.

3. The sport fishing outrigger assembly according to claim 1 wherein said guide means includes a locking clamp operatively associated with a clasp mounted to said position adjustment locking mechanism for use in maintaining said boom in a raised position.

4. The sport fishing outrigger assembly according to claim 3 wherein said locking clamp is spring biased and automatically engaged when said boom is placed in a raised position.

5. The sport fishing outrigger assembly according to claim 3 wherein said locking clamp includes an optional locking pin to disable operation of said locking clamp.

6. The sport fishing outrigger assembly according to claim 1 wherein said guide means includes a primary locking pin to secure said boom in a raised storage position.

7. The sport fishing outrigger assembly according to claim 1 wherein said boom is angular secured to said position adjustment locking mechanism at about 40 degrees.

8. The sport fishing outrigger assembly according to claim 1 wherein said castellated aperture slots have about a 70 degree range of separation.

9. A sport fishing outrigger assembly comprising:
  a boom having a length defined by a proximal end and a distal end; a position adjustment locking mechanism comprised of an indexing collar with at least two vertically oriented castellated aperture slots, said collar being fixably attached to an indexing pipe having a first end angularly secured to said proximal end of said boom and a second end having a clevis pivotedly coupled to an adjustable base positioned perpendicular thereto and securable to a side surface of a boat; said indexing pipe rotatably containing a boom holding assembly with a handle locking engagement assembly for downward engagement with said aperture slots; a guide assembly secured to said boat side surface above said second end of said indexing pipe; a locking clamp coupled to said guide assembly; and a clasp mounted to said position adjustment locking mechanism for engagement of said locking clamp to maintain said boom in a raised position;
  whereby said guide assembly maintains said indexing pipe in a parallel position to said side surface of said boat, said indexing pipe allowing said distal end of said boom to be rotated from a lockable storage position parallel to said side surface of said boat to a position outboard of said boat.

10. The sport fishing outrigger assembly according to claim 9 wherein said locking clamp is spring biased and automatically engaged when said boom is placed in a raised position.

11. The sport fishing outrigger assembly according to claim 9 wherein said guide assembly includes a primary locking pin to secure said boom in a raised storage position.

12. The sport fishing outrigger assembly according to claim 9 wherein said locking clamp includes an optional locking pin to disable operation of said locking clamp.

13. The sport fishing outrigger assembly according to claim 9 wherein said boom is angular secured to said position adjustment locking mechanism at about 40 degrees.

14. The sport fishing outrigger assembly according to claim 9, wherein said boom, position adjustment locking mechanism and said handle locking assembly are made from metal.

15. The sport fishing outrigger assembly according to claim 9 wherein said handle locking engagement assembly includes an aluminum handle with an end proximal and distal to the user's hand, said distal end including a cavity for weldably receiving an aluminum locking bar.

16. The sport fishing outrigger assembly according to claim 15 wherein said locking bar includes a through hole for pivotally mounting said handle locking engagement assembly onto said boom holding assembly, said bar being shaped to securely engage said aperture slots when pivoted downward into locking position.

17. The sport fishing outrigger assembly according to claim 9 wherein said boom includes a raised boss constructed from plastic to position said boom against a spacer block while in a lowered position.

18. The sport fishing outrigger assembly according to claim 9 wherein said indexing collar is constructed of aluminum with delrin inserts.

19. A sport fishing outrigger assembly comprising:

a boom having a length defined by a proximal end and a distal end;

a position adjustment locking mechanism having a first end angularly secured to said proximal end of said boom and a second end having a clevis pivotedly coupled to a side surface of a boat;

a handle locking engagement assembly operatively associated with said position adjustment locking mechanism, said handle permitting manual rotation movement of said boom; and a guide means for permitting controlled movement of said position adjustment locking mechanism within a plane parallel to said side of said boat, said guide means being secured to said side surface of said boat above said second end of said position adjustment locking mechanism, said guide means including a boundary member oriented parallel to said side of said boat and being spaced apart therefrom by a first spacing member extending transversely from said boundary member and a second spacing member extending transversely from said boundary member, said boundary member and said spacing members cooperatively forming a guide aperture constructed and arranged to allow limited pivotal motion of said position adjustment locking mechanism in a plane parallel to said boat side surface, from a raised position adjacent said first spacing member and a lowered position adjacent said second spacing member;

whereby said guide means facilitates pivotal motion of said position adjustment locking mechanism, within said guide aperture in a parallel position to said side surface of said boat in said raised or lowered position and said position adjustment locking mechanism allowing said distal end of said boom to be rotated from a position parallel to said side surface of said boat to a position outboard of said boat.

20. The sport fishing outrigger assembly according to claim 19 wherein said guide means includes a locking clamp operatively associated with a clasp mounted to said position adjustment locking mechanism for use in maintaining said boom in a raised position.

21. The sport fishing outrigger assembly according to claim 20 wherein said locking clamp includes a primary locking pin to disable operation of said locking clamp.

22. The sport fishing outrigger assembly according to claim 19 wherein said boom is angular secured to said position adjustment locking mechanism at about 40 degrees.

23. The sport fishing outrigger assembly according to claim 19 wherein said clevis includes a centrally disposed bushing allowing pivotal securement to a base member means adaptable for securement to said boat.

* * * * *